W. A. Wood.
Harvester Dropper.
No. 23,878.  Patented May 3, 1859.
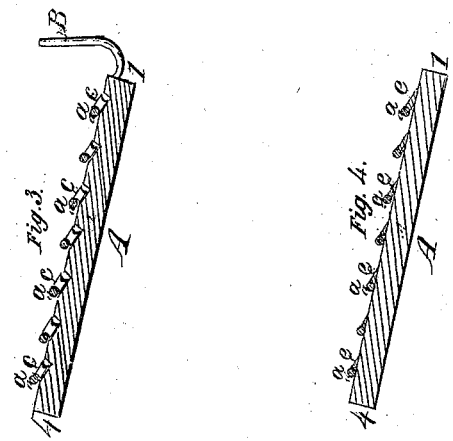
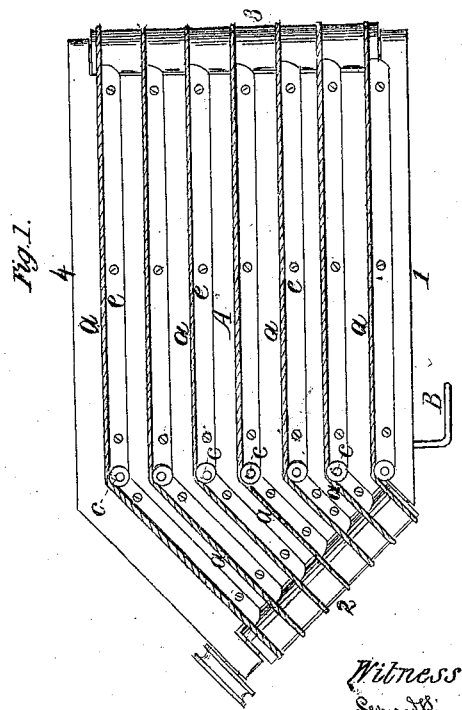
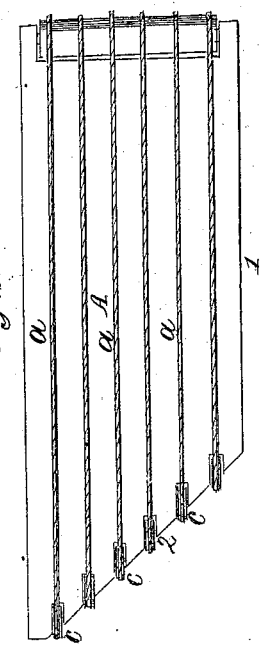
Witnesses  W. A. Wood

UNITED STATES PATENT OFFICE.

W. A. WOOD, OF HOOSICK FALLS, NEW YORK.

IMPROVEMENT IN HARVESTING-MACHINES.

Specification forming part of Letters Patent No. 23,878, dated May 3, 1859.

*To all whom it may concern:*

Be it known that I, W. A. Wood, of Hoosick Falls, in the county of Rensselaer and State of New York, have invented certain new and useful Improvements in the delivery apparatus of Harvesting-Machines, which I term a "swathing-machine;" and I do hereby declare the following to be a full, clear, and exact description of the same, reference being had to the accompanying drawings, making a part of this specification, in which—

Figure 1 represents a top view of a platform upon which the cut grain falls, and showing the series of carrying-belts in place. Fig. 2 represents a top view of a similar platform, with a modified arrangement of the belts for effecting the same object. Figs. 3 and 4 represent vertical cross-sections through the platform and conveying apparatus.

Similar letters of reference, where they occur in the several figures, denote like parts of the apparatus in all of them.

Carrying-belts have been used in conveying grain from the platform of a harvesting-machine; but where so used the belts have all been of uniform length, or the platform has been rectangular, which of course implies the use of belts of uniform lengths.

My invention consists in the application of a series of carrying-belts to an oblique delivery, and which implies the use of belts of variable lengths, inasmuch as the line of delivery is not parallel to or at right angles with the front or grain side of the platform; or, in other words, my invention consists in conveying cut grain from the platform of a harvesting-machine by a system or series of endless belts combined with a platform having at least one oblique side, or by a system or series of belts of varying lengths to effect an oblique delivery of the grain.

To enable others skilled in the art to make and use my invention, I will proceed to describe the same with reference to the drawings.

A represents a platform with five sides, in which the side 1 is placed next to the cutting apparatus, and the side 2 is the delivery side. Over the top of this platform, and around rollers or drums at the sides 2 3 thereof, pass a series of carrying-belts, *a a*, &c. These belts do not travel in a right line, but pass behind pullies *c c*, where their parallelism with the front of the platform is changed; and from thence they run in an oblique direction to the delivery edge 2, pass around the roller or drum there, and return under the platform to the opposite side, 3, and so on. The platform stands at an inclination from front to rear, (1 to 4,) as shown in Figs. 3 4; and the pulleys *c*, as shown in Fig. 3, have a greater inclination than the platform, the object being to prevent them from opposing the free conveyance of the grain by projecting above the platform in front, but to project in rear sufficient to allow the carrying-belts *a a* to run or pass in their grooves; and to prevent the straw from getting underneath the belts inclined ribs *c*, as shown in Fig. 4, are placed in front of said belts, which raise up the straw and prevent it from getting under them.

B is a shield at the frame end of the platform, which may be a simple piece of bent wire that will catch and partially retain the butts of the stalks as they are carried along by the belts while the heads continue to move along, and thus the bundle or gavel is turned around until it is parallel with the oblique delivery side 2, where it drops off onto the ground by the continued motion of the belts. In Fig. 2 the same oblique delivery is attained by the series of belts; but in this case the pulleys *c* are moved to the delivery side and set up edgewise, which, in effect, would be the same as cutting up the drum or roller of Fig. 1 into sectious—one for each belt. This modification admits of the belts moving in a right line, instead of a partially oblique one; but they must be of variable lengths, so as to come out to the line of the oblique or delivery side.

It is obvious that an oblique rear delivery may be effected by the same system of belts of variable lengths, or any delivery when the delivery side is not parallel to or at right angles with the line of cutters or the receiving side of the platform; and it is immaterial to my invention what the general form of the platform may be, whether four, as in Fig. 2, or five sided, as in Fig. 1. It may be of a trapezoidal or rhomboidal form; but so long as the delivery side is oblique to the receiving side of the platform, and the grain is carried by a series of two or more belts, I should consider it as involving my invention.

The belts may be driven from any of the moving parts of the harvester, and their motion graduated to the quality of the crop.

The motion may be continuous or intermittent, just as the delivery may be preferred, all of which is well known to mechanicians and need not be more than mentioned.

Having thus fully described the nature and object of my invention, what I claim therein as new, and desire to secure by Letters Patent, is—

Effecting an oblique delivery of the cut grain from the platform where it falls by a series of carrying-belts of different lengths, substantially as described.

W. A. WOOD.

Witnesses:
LEONARD KING,
FRANK WOOD.